United States Patent
Paszkowski

[11] 3,755,713
[45] Aug. 28, 1973

[54] ELECTRICALLY CONDUCTIVE SURFACE FOR AIRCRAFT

[75] Inventor: Joseph B. Paszkowski, Seattle, Wash.

[73] Assignee: The Boeing Company, Seattle, Wash.

[22] Filed: July 25, 1972

[21] Appl. No.: 274,948

[52] U.S. Cl. ................................. 317/2 E, 244/1 A
[51] Int. Cl. ............................................ H05f 1/02
[58] Field of Search ...................... 317/2 E; 244/1 A

[56] References Cited
UNITED STATES PATENTS
3,498,572   3/1970   Lumn .................................. 317/2 E
2,982,494   5/1961   Amason .............................. 317/2 E Primary Examiner—J. D. Miller
Assistant Examiner—Harry E. Moose, Jr.
Attorney—Glenn Orlob, H. Gus Hartmann et al.

[57] ABSTRACT

The invention is directed to the method of controlling electrostatic charge on aircraft and vulnerability to lightning strikes and relates to the use of a knitted wire mesh material applied over a glass fiber composite panel or plastic aerodynamic surface of an aircraft to form a permanent integral part of the surface and wherein the mesh is of the same material as the remainder of the aircraft in order to prevent corrosion. In the case of an aluminum aircraft, the mesh is also made of aluminum and therefore is electrochemically compatible and eliminates the problems generally associated with the use of electrochemically dissimilar materials.

3 Claims, 2 Drawing Figures

ELECTRICALLY CONDUCTIVE SURFACE FOR AIRCRAFT

BACKGROUND OF THE INVENTION

Non-metallic materials (e.g., plastics, boron and glass fiber composites, etc.) are used extensively for aerodynamic surfaces and being electrically non-conductive, must be coated with an electrically conductive finish to control the accumulation or amount of electrostatic charge. The electrostatic charge which an aircraft accumulates in flight is dissipated or shed via static dischargers installed at the aerodynamic trailing edges and extremities such as the wing tips. The electrostatic charge reaches these devices via the continuous and electrically conductive metallic structure of the aircraft. In areas where electrically non-conductive materials or electrical discontinuities occur, special provision must be made for the dissipation of the electrical charge. Many of the present known conductive finishes for controlling the accumulation of the electrostatic charge on the plastic panels or non-conductive aerodynamic surfaces of an aircraft, are heavily loaded with carbon. Although the primary purpose of these carbon-loaded coatings is to control the amount of build-up of the electrostatic charge, a second and very desirable goal would be to protect the panels against lightning strikes. This is almost non-existent with the present coatings owing to their very high electrical resistance. During the past years, electrical resistance measurements have been made on a large number of conductive finish installations both on laboratory made test samples and production parts. The results indicated that with a uniformly applied carbon-loaded or metallic characteristic material, although, the electrical resistance values in no case exceeded 50,000 ohms per square, they offered little if any protection against lightning strikes and in most cases the underlying glass fiber composite was destroyed.

Since many of the present known carbon-loaded electrically conductive finishes for aircraft are primarily used for equalizing the electrical potential on the surface of the glass fiber composite panel or non-conductive material, the coating finish must in turn be electrically connected to the structure of the aircraft, which in most cases is aluminum, in order to provide a path for draining off of the accumulated electrostatic charge. The effectiveness of any conductive finish depends almost entirely on he quality of the electrical bond between it (the finish) and the metallic structure of the aircraft for providing the electrical connection or path over which the electrostatic charge can reach aircraft structure. A problem arises accordingly as to corrosion in the connection between these two materials since, carbon and aluminum are widely separated in the electrochemical series and make it nearly impossible to design a corrosion-free connection. The carbon-loaded finish is situated at one end of the galvanic series and the metallic structure, in most cases being aluminum, is at the other or anodic end of the galvanic series; with a potential difference between the carbon and aluminum of approximately 0.90 volts. This is a very large value from the standpoint of corrosive activity. Thus the engineer is confronted with physically connecting these two widely dissimilar metals (carbon being considered a metal in view of its behavior in the presence of aluminum).

The carbon-loaded finishes are generally preferred over the spray-on metallic compositions because one of the main disadvantages of using the spray-on metal coating over a fiberglass panel is that the coating flakes off due to vibration and/or thermal expansion and contraction, and also causes cracks leaving areas of electrical discontinuities which become the source of electromagnetic interference.

SUMMARY OF THE INVENTION

The invention relates to applying a knitted wire mesh material on to a glass fiber composite or electrically non-conductive structural panel of an aircraft for forming an electrically conductive exterior surface that controls the accumulation of electrostatic charge and protects the underlying panel structure from damage by lighting strikes; and more particularly, to the use of a knitted wire mesh material that is electrochemically compatible with the basic structural metal or remaining metal skin of the aircraft, such that a corrosion-free electrical path between these two materials is produced.

Presently known aircraft, such as the Boeing 747, extensively utilize panels of an electrically non-conductive material such as a glass fiber composite structure for much of the exterior aerodynamic surface. These electrically non-conductive panels, being exposed to the airstream, present two problems: (1) they become charged electrostatically when the aircraft is in flight; and (2) they are vulnerable to the destructive effects of lighting strikes. In order to control the accumulation of the electrostatic charge onto these non-conductive panels they are coated with a carbon-loaded finish which does not protect nor decrease the damage to the structural integrity of the panel from lightning strikes. Further, the carbon granules in this finish must in turn be interconnected electrically with the metallic structure of the aircraft. Since carbon and aluminum are widely separated in the electrochemical series, it is impossible to design a corrosion-free electrical path between these two materials. Any corrosion or discontinuity at the interface between the carbon coating and the fastener used to attach the panel to aircraft structure can cause electromagnetic interference in the electronic systems onboard the aircraft and in particular in the communications systems. Another disadvantage of using a carbon compound for coating the non-conductive panels, is that carbon has a high electrical resistance which makes the dissipation of the electrical energy from a lighting stroke extremely difficult and the general result is that the glass fiber structure or underlying non-conductive material is damaged or destroyed.

In the present invention, a knitted wire mesh material that is electrochemically compatible with the basic metal of the aircraft, is applied over the glass fiber panel and is bonded thereto to form a permanent and integral part of the composite structure. When this structure is struck by lightning, the countless electrically continuous loops of the wire mesh, fuse and dissipate the electrical energy of the lightning stroke on the surface of the composite material without the generally destructive penetration of the lightning stroke through the glass fiber material.

DESCRIPTION OF THE PREFERRED EMBODIMENTS

Figure 1:
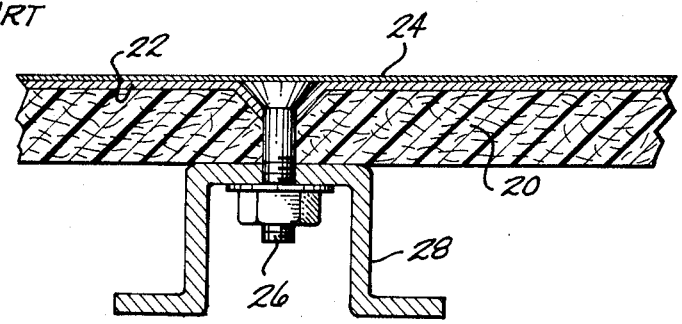
FIG. 1 is a cross-sectional view of a glass fiber composite panel having a carbon-loaded conductive finish and the present known method for connecting these two materials which are electrochemically very dissimilar.

FIG. 1 shows a present known method and depicts the carbon coating to aircraft structure with a glass fiber composite panel 20, having a carbon-loaded conductive coating 22 and decorative finish 24 thereover. The carbonloaded conductive finishes generally weigh approximately 0.008 pounds per square foot when deposited 1.0 mil thick; and the usual deposit is 0.5 mil weighing 0.004 pounds per square foot or 0.064 ounces per square foot. The carbon coating 22 is generally connected via an electrical conductor or metal fastener 26 to aircraft aluminum structure. Even though the metal fastener 26 may be of monel and cadmium plated to make it electrochemically compatible with aluminum, with age and entry of moisture, the cadmium in contact with carbon coating 22, can be expected to corrode away since corrosion of some degree is inevitable with the great electrochemical dissimilarity between carbon and aluminum.

Figure 2:
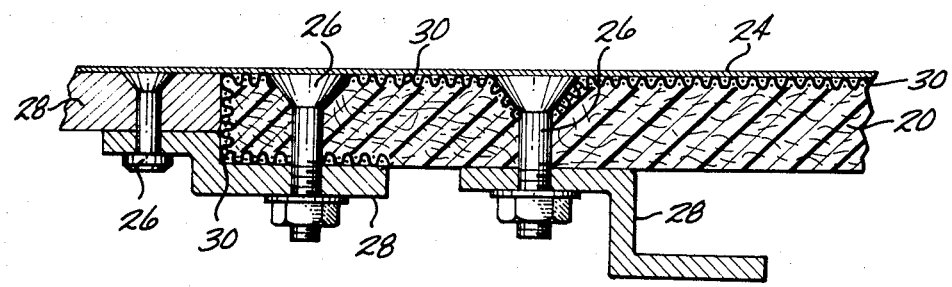
FIG. 2 is an illustration in cross-section of the present invention depicting a fiberglass panel having the knitted wire mesh material adhesively integral with the outer surface and means for fastening the composite panel to aircraft structure via an electrical connection.

FIG. 2 is a cross-sectional illustration of the present invention for overcoming the disadvantages of the carbon coating method which improves the control of the electrostatic charge, and in addition, offers protection against lightning strikes which was not possible with the known carbon coatings due to their very high electrical resistance. As shown, it consists of a knitted mesh 30 of fine aluminum wire laid up on the surface of the nonmetallic panel 20. The knitted mesh is made from an 0.005 inch diameter wire of 5056 aluminum and the material has a weight of 0.1535 ounces per square foot. A knitted mesh made from 0.003 inch diameter wire of 5056 aluminum would weigh 0.055 ounces per square foot. The knit of the mesh is formed in a manner similar to that in a textile fabric, i.e., by the interlacing of a single wire or thread in a series of connected loops and the diameter of the wire used would depend largely on the capability of the knitting machine. A wire size between 0.003 and 0.005 inches in diameter produces a satisfactory material for aircraft in that it is light enough to do the job. The electrical resistance of this mesh is of the order of thousands of times less than the currently used carbon coating. This means that the knitted mesh need be connected to aircraft structure at only a few places or at least in far fewer places than was necessary with the carbon coatings. The greater the wire diameter, the more difficult it becomes to conform the material to compound surface contours, which is one of the main advantages of a knit over a woven material because the woven material when stretched over compound curves would wrinkle thereby impairing surface smoothness. The knitted wire mesh is imbedded in a resin coating when applied to the outer surface of the glass fiber composite panel such that the aerodynamic surface finish is smooth since it is not necessary that the wire knit be in direct contact with the airflow for producing satisfactory results with respect to the control of the accumulation of electrostatic charges and lightning protection.

While the invention has been disclosed with reference to a preferred embodiment, it is to be understood that those modifications and changes which become obvious to a person skilled in the art as a result of the teachings hereof, will be encompassed by the following claims:

What is claimed is:

1. A panel contoured to form an external aerodynamic surface of an aircraft and for protecting the aircraft from becoming electrostatically charged and vulnerable relative to lightning strikes, said panel comprising: a layer of electrically non-conducting fiber reinforced plastic material; and a knitted mesh of electrically conductive wire material that is electrochemically compatible with the metal structure of the aircraft to which it is to be fastened; said knitted mesh being completely embedded in the adhesive resin of the fiber reinforced plastic material so as to be integral therewith and forming therewith an aerodynamically smooth exterior surface.

2. A lightning protective layer for an electrically non-conductive external aerodynamic surface of an aircraft comprising: a knitted mesh of electrically conductive wire from a material that is electrochemically compatible with the metal structure of the aircraft to which it is to be fastened; said knitted mesh being stretch formed over the outer aerodynamic surface of the electrically non-conductive material and adhesively bonded thereto; means for fastening the knitted wire mesh to the metal structure of the aircraft through an electrical connection to provide a path for draining off the electrostatic charge from the electrically nonconductive material; and said knitted wire mesh forming a lightning protective layer and surface barrier for limiting the depth of penetration of the lightning stroke.

3. The method of protecting an electrically nonconductive panel on the aerodynamic surface of an aircraft from damage due to a lightning strike comprising: applying an adhesive resin over the exterior aerodynamic surface of the electrically non-conductive panel; stretching a knitted mesh of electrically conductive wire material that is electrochemically compatible with the metal structure of the aircraft to which it is to be fastened over the panel so that the knitted wire mesh is completely embedded in the adhesive resin; curing the adhesive resin so as to integrally bond the knitted wire mesh to the panel with the exterior surface being aerodynamically smooth with respect to the airflow; and fastening the knitted wire mesh composite panel through an electrical connection to provide a path for draining off the electrical charge to the metal structure of the aircraft.

* * * * *